(12) United States Patent
Lim et al.

(10) Patent No.: US 12,499,806 B2
(45) Date of Patent: Dec. 16, 2025

(54) MULTI-LEAST SIGNIFICANT BIT (LSB) DITHERING SYSTEMS AND METHODS

(71) Applicant: Apple Inc., Cupertino, CA (US)

(72) Inventors: Jongyup Lim, San Jose, CA (US); David S Zalatimo, San Jose, CA (US); Hyunwoo Nho, Palo Alto, CA (US); Jie Won Ryu, San Jose, CA (US); Koorosh Aflatooni, Los Altos Hills, CA (US); Myungjoon Choi, San Diego, CA (US); Wei Xiong, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 18/446,694

(22) Filed: Aug. 9, 2023

(65) Prior Publication Data

US 2024/0135856 A1 Apr. 25, 2024
US 2024/0233604 A9 Jul. 11, 2024

Related U.S. Application Data

(60) Provisional application No. 63/418,954, filed on Oct. 24, 2022.

(51) Int. Cl.
*G09G 3/20* (2006.01)
*G06T 11/00* (2006.01)

(52) U.S. Cl.
CPC .......... *G09G 3/2044* (2013.01); *G06T 11/001* (2013.01)

(58) Field of Classification Search
CPC .......... G09G 3/2044; G09G 2320/0276; G09G 2340/0428; G09G 3/2051; G09G 3/2055; G06T 11/001
See application file for complete search history.

(56) References Cited

U.S. PATENT DOCUMENTS

| | | | | |
|---|---|---|---|---|
| 5,298,915 A | * | 3/1994 | Bassetti, Jr. | G09G 3/3611 348/E3.015 |
| 5,353,127 A | * | 10/1994 | Shiau | H04N 1/4052 358/465 |
| 5,748,163 A | * | 5/1998 | Han | G09G 3/3611 345/691 |
| 10,395,584 B2 | | 8/2019 | Nadershahi | |
| 11,430,398 B2 | | 8/2022 | Buckley | |
| 11,521,538 B2 | | 12/2022 | Jo et al. | |

(Continued)

OTHER PUBLICATIONS

Luengo, "Dithering," from "Cris' Image Analysis Blog", https://www.crisluengo.net/archives/355/ (Year: 2011).*

(Continued)

*Primary Examiner* — Daniel F Hajnik
*Assistant Examiner* — Adeel Bashir
(74) *Attorney, Agent, or Firm* — Fletcher Yoder, P.C.

(57) ABSTRACT

An electronic device may include an electronic display having multiple display pixels that display an image based on dithered image data. The electronic device may also include image processing circuitry that generates the dithered image data based on input image data and a threshold gray level that is greater than one. Generating the dithered image data may include replacing each gray level of the input image data that is less than the threshold gray level with either a zero gray level or the threshold gray level according to a dither pattern.

20 Claims, 12 Drawing Sheets

(56) References Cited

U.S. PATENT DOCUMENTS

| | | | |
|---|---|---|---|
| 2003/0030611 A1* | 2/2003 | Kim | G09G 3/3611 |
| | | | 345/89 |
| 2005/0052703 A1* | 3/2005 | Pettitt | G09G 3/2022 |
| | | | 358/3.26 |
| 2005/0243223 A1* | 11/2005 | Slobodin | H04N 9/315 |
| | | | 348/E9.027 |
| 2008/0225054 A1* | 9/2008 | Kim | G09G 3/2051 |
| | | | 345/599 |
| 2010/0207959 A1* | 8/2010 | Qi | G09G 3/2055 |
| | | | 345/522 |
| 2012/0229497 A1* | 9/2012 | Tripathi | G09G 3/2037 |
| | | | 345/596 |
| 2022/0198986 A1 | 6/2022 | Jun | |

OTHER PUBLICATIONS

Tu Wien, "Dithering and Raster Graphics,"; https://www.cg.tuwien.ac.at/courses/CG2/SS2002/RasterGraphics.pdf (Year: 2002).*

* cited by examiner

MULTI-LEAST SIGNIFICANT BIT (LSB) DITHERING SYSTEMS AND METHODS

CROSS-REFERENCE TO RELATED APPLICATIONS

This application claims priority to and the benefit of U.S. Provisional Application No. 63/418,954, entitled "Multi-Least Significant Bit (LSB) Dithering Systems and Methods," filed Oct. 24, 2022, which is hereby incorporated by reference in its entirety for all purposes.

SUMMARY

The present disclosure generally relates to dithering of image data for display on an electronic display.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The luminance output of a display pixel is set based on a voltage supplied at the pixel corresponding to a gray level (GL) of the image data. However, in some scenarios, the voltages supplied at low GLs may cause non-uniform luminance responses amongst different pixels of a display panel. In other words, pixel non-ideality may increase or be more pronounced at low GLs. For example, some GLs may correspond to voltage levels near, at, or below the threshold voltage for pixel activation. Moreover, as should be appreciated, while a theoretical threshold voltage and/or voltage levels (e.g., continuous or pulse width modulated) for low GLs may be known for ideal pixels, some pixels' characteristics may vary (e.g., due to manufacturing and/or calibration variances), and such variances in pixels may become more pronounced at lower GLs. As such, variation in the accuracy of the luminance output may occur at the lower GLs. As should be appreciated, although discussed herein in the context of pixel non-uniformity at low GLs, the present techniques may be applied to any spectrum of GLs where pixel luminance output non-uniformity is exhibited.

As such, in some embodiments, a multi-least significant-bit (multi-LSB) dither may be accomplished to remove/replace GLs below a threshold. A threshold GL may be set (e.g., based on the estimated variances of the display panel) such that GLs below the threshold GL are dithered between GL_0 and the threshold GL. In other words, instead of dithering GLs between GL_N and GL_N+1, the multi-LSB dither may dither low GLs between GL_0 and the threshold GL, which is greater than GL_1. For example, if the threshold GL is set to GL_4/255, pixels with image data GL values of 0/255-3/255 (or 4/255) may be spatially and/or temporally dithered to include GL values of either 0/255 or 4/255 such that the spatial and/or temporal average luminances of the pixels are perceived as that of the original image data, and the luminance variances associated with GLs less than the threshold GL are reduced or eliminated. Multi-LSB dithering may be used for any suitable bands of gray levels. For example, additionally or alternatively, multi-LSB dithering may be used for a band of gray levels higher than low gray levels. For example, if gray levels 100/255 through 108/255 are particularly variable, multi-LSB dithering may be used to achieve luminances equivalent to the gray levels in between gray levels 100/255 and 108/255.

BRIEF DESCRIPTION OF THE DRAWINGS

Various aspects of this disclosure may be better understood upon reading the following detailed description and upon reference to the drawings described below.

DETAILED DESCRIPTION

Figure 1:
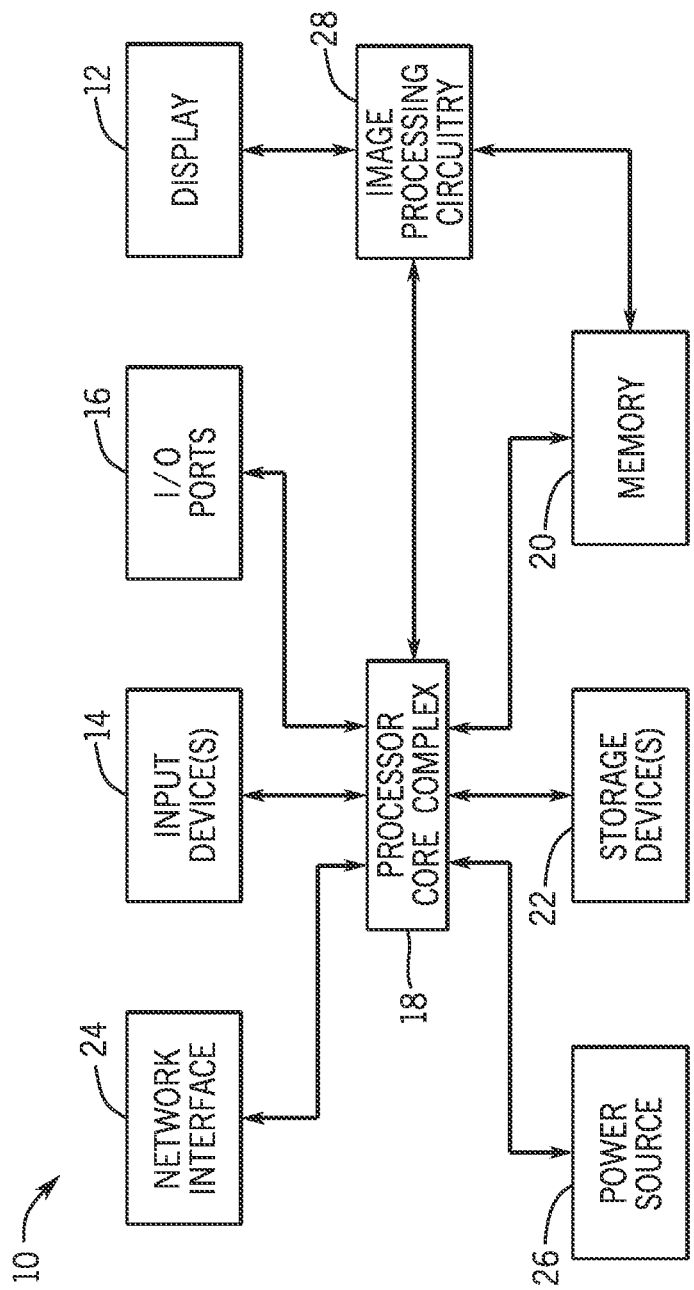
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution.

In some embodiments, the display pixels may include self-emissive pixels such as light emitting diodes (LEDs), organic LEDs (OLEDs), etc. or utilize transmissivity regulating elements such as liquid crystal pixels. In general, self-emissive pixels generate light indicative of a target luminance level according to the image data associated with the corresponding pixel. Alternatively, transmissive displays (e.g., liquid crystal displays (LCDs) utilize one or more backlights to generate light and regulate the amount and/or color of the generated light via transmissivity regulating elements according to the image data.

An image data source may provide the image data as a stream of pixel data, in which data for each pixel indicates a target luminance (e.g., brightness and/or color) of one or more display pixels located at corresponding pixel positions. In some embodiments, image data may indicate target luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale, or other color basis. It should be appreciated that a luma channel, as disclosed herein, may encompass linear, non-linear, and/or gamma-corrected luminance values and may be of any suitable bit-depth.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer. Moreover, the image data may be altered to enhance perceived contrast, sharpness, resolution, etc. For example, in some embodiments, image data may be dithered spatially, temporally, or spatiotemporally. In general, dithering allows for a spatial and/or temporal distribution of an increase or decrease in image data values (e.g., gray level value) to provide an effective increase in bit depth in the spatial, temporal, or spatiotemporal average.

As should be appreciated, the luminance output of a display pixel is set based on a voltage supplied at the pixel corresponding to a gray level of the image data. However, in some scenarios, the voltages supplied at low gray levels (e.g., less than gray level (GL) 32/255, less than GL_16/255, less than GL_8/255, less than GL_4/255, less than GL_2/255, or similar relative GLs of other bit-depths) may cause non-uniform luminance responses amongst different pixels of a display panel. In other words, pixel non-ideality may increase at low GLs. For example, some GLs may correspond to voltage levels near, at, or below the threshold voltage for pixel activation. Moreover, as should be appreciated, while a theoretical threshold voltage and/or voltage levels (e.g., continuous or pulse width modulated) for low GLs may be known for ideal pixels, some pixels' characteristics may vary (e.g., due to manufacturing and/or calibration variances), and such variances in pixels may become more pronounced at lower GLs. As such, variation in the accuracy of the luminance output may occur at the lower GLs. As should be appreciated, although discussed herein in the context of pixel non-uniformity at low GLs, the present techniques may be applied to any spectrum of GLs where pixel luminance output non-uniformity is exhibited.

As such, in some embodiments, a multi-least significant-bit (multi-LSB) dither may be accomplished to remove/replace GLs below a threshold. A threshold GL may be set (e.g., based on the estimated variances of the display panel) such that GLs below the threshold GL are dithered between GL_0 and the threshold GL. In other words, instead of dithering GLs between GL_N and GL_N+1, the multi-LSB dither may dither low GLs between GL_0 and the threshold GL, which is greater than GL_1. For example, if the threshold GL is set to GL_4/255, pixels with image data GL values of 0/255-3/255 may be spatially and/or temporally dithered to include GL values of either 0/255 or 4/255 such that the spatial and/or temporal average luminances of the pixels are perceived as that of the original image data, and the luminance variances of the pixels associated with GLs less than the threshold GL are reduced or eliminated.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
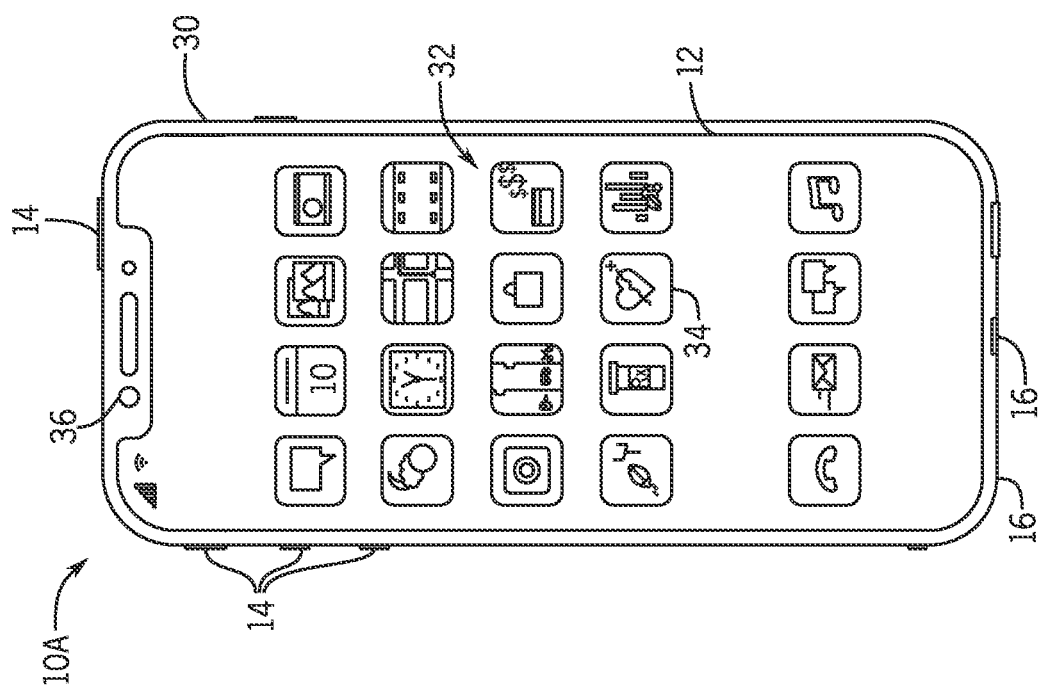
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
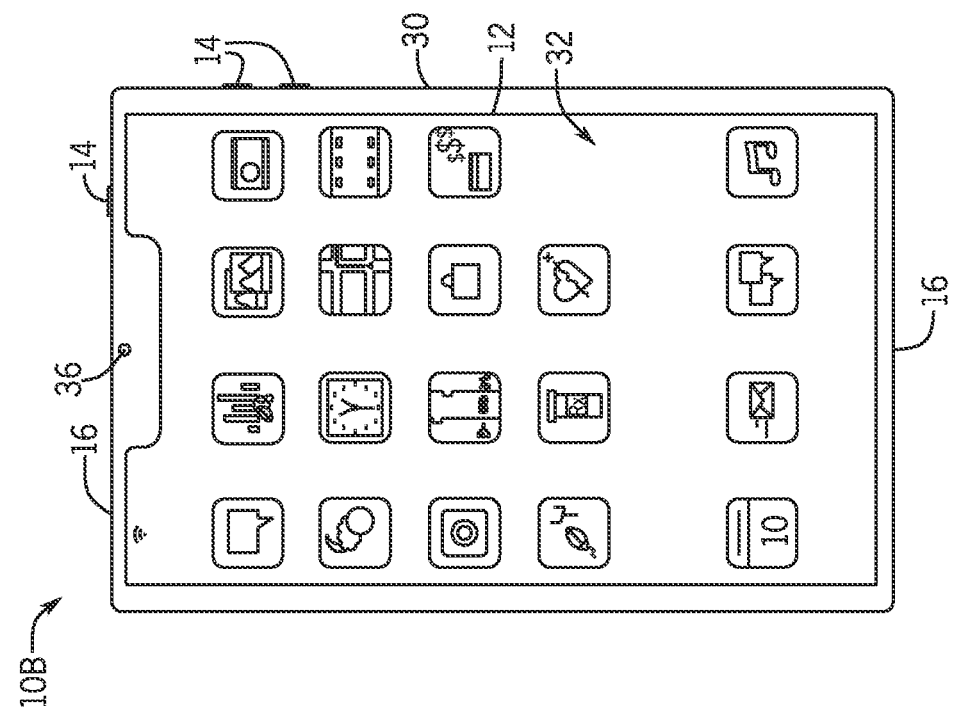
FIG. 3 is a front view of a tablet device representing an example of the electronic device of FIG. 1, in accordance with an embodiment.
Figure 4:
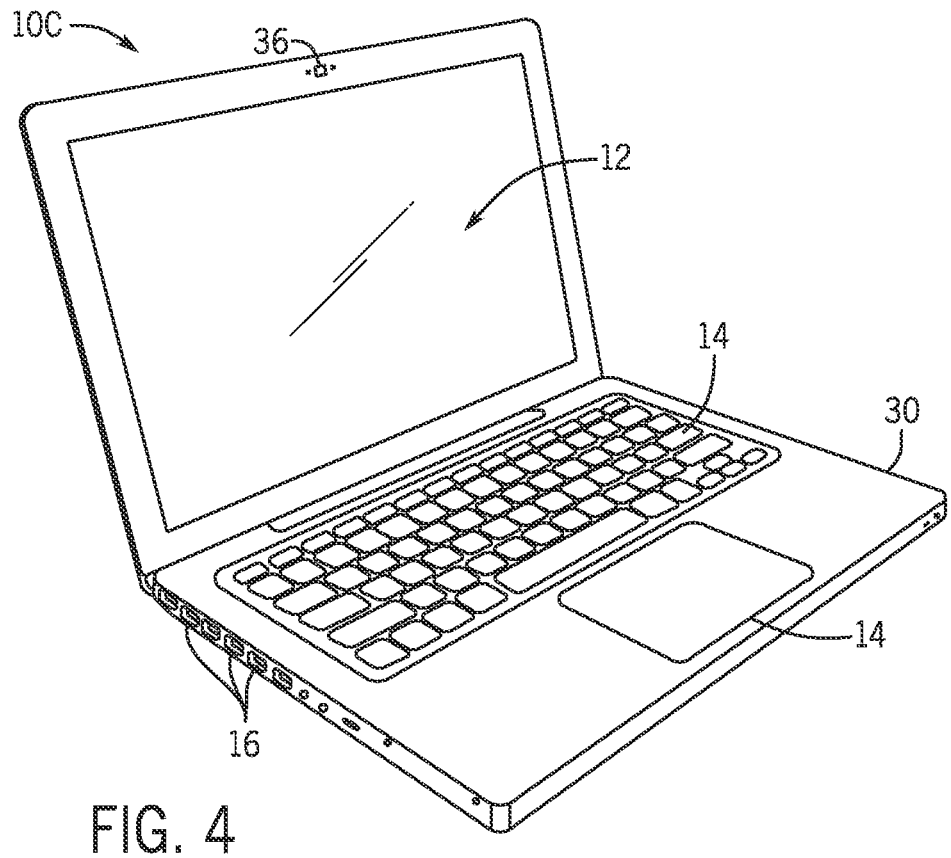
FIG. 4 is a front view of a notebook computer representing an example of the electronic device of FIG. 1, in accordance with an embodiment.
Figure 5:
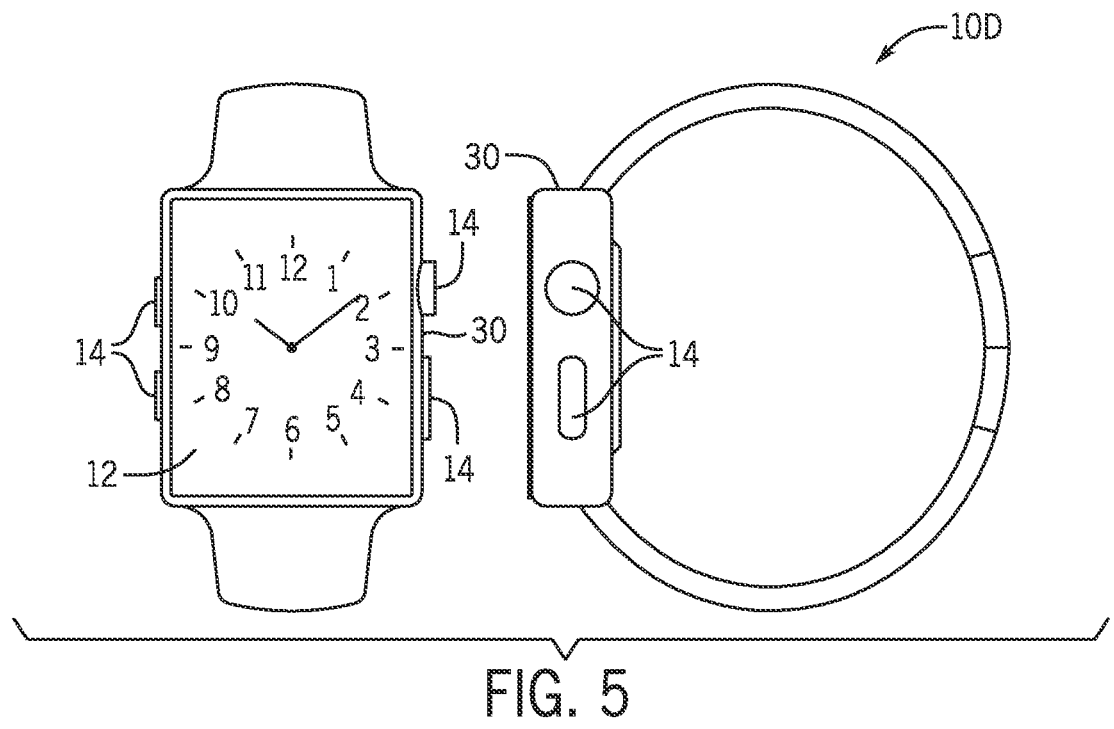
FIG. 5 is a front and side view of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
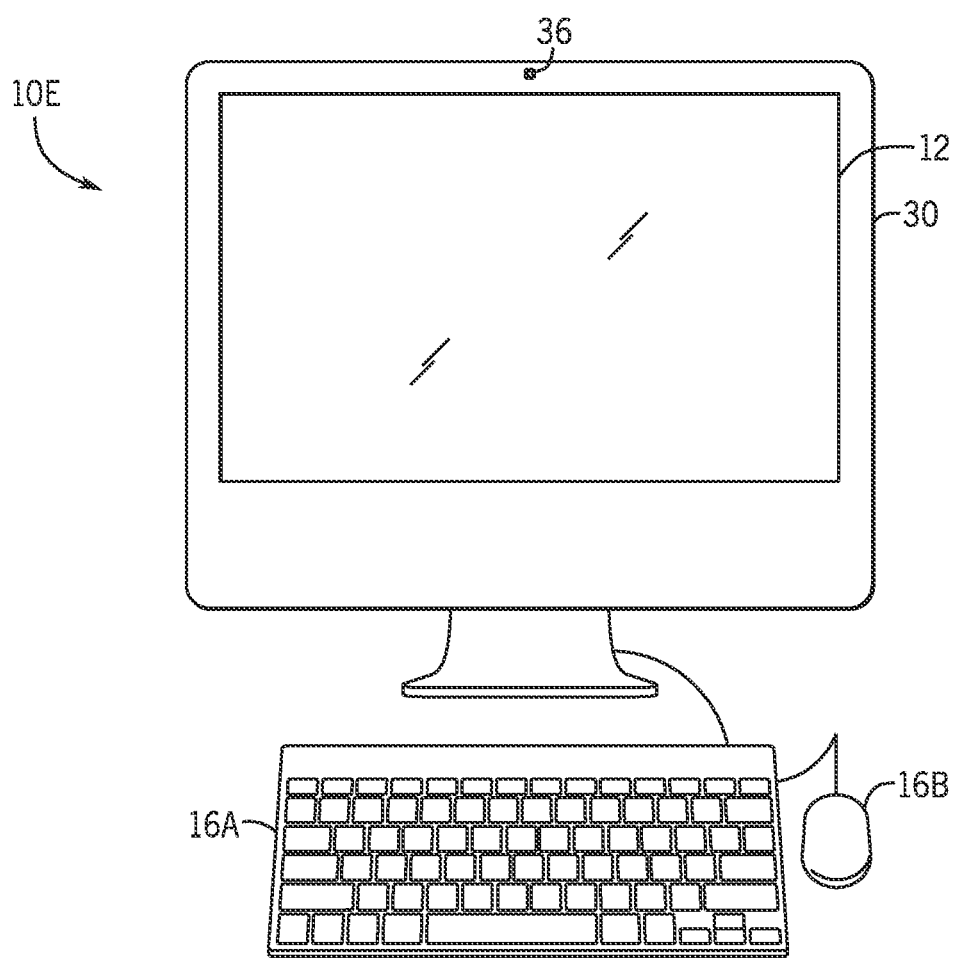
FIG. 6 is a front view of a computer representing an example of the electronic device of FIG. 1, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
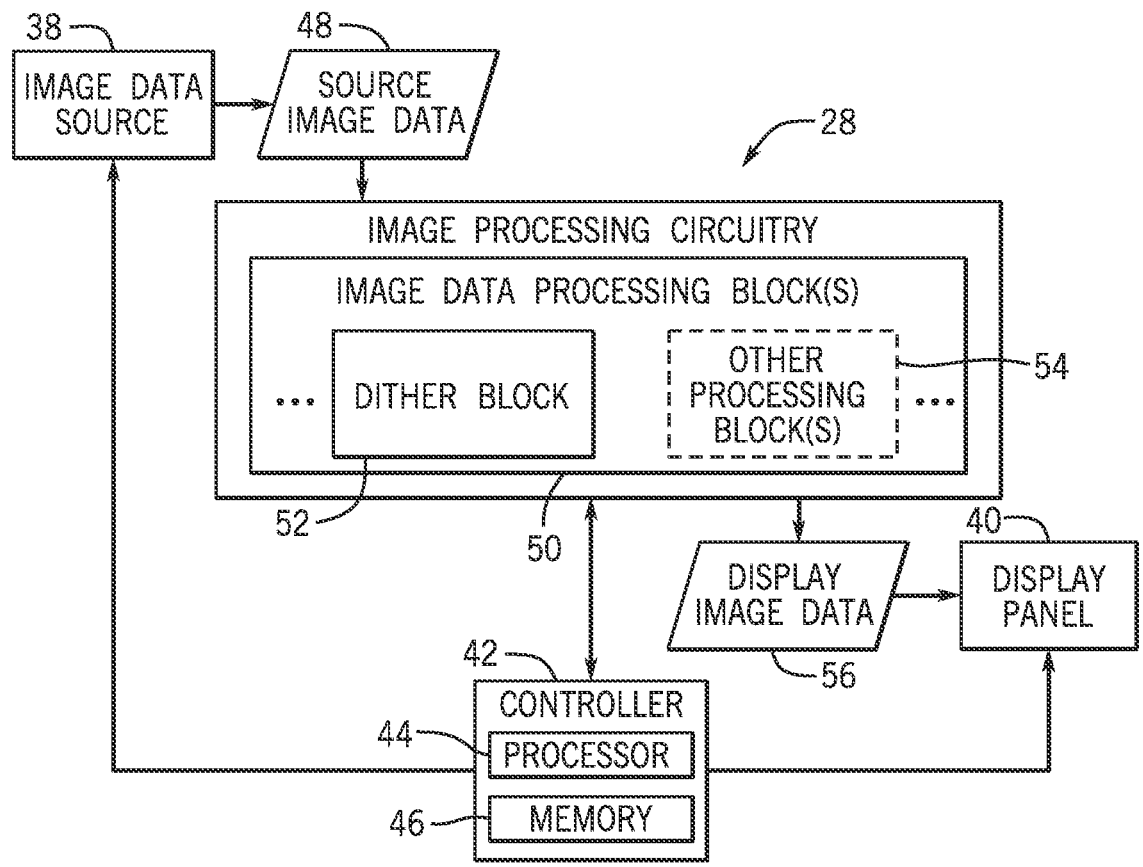
FIG. 7 is a block diagram of a portion of the image processing circuitry of FIG. 1 including a dither block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a dither block 52. As should be appreciated, multiple other processing blocks 54 may also be incorporated into the image processing circuitry 28, such as a color management block, a pixel contrast control (PCC) block, a burn-in compensation (BIC) block, a scaling/rotation block, etc. before and/or after the dither block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As described herein, the dither block 52 may adjust image data (e.g., by color component and/or grey level), for example, to facilitate compensating for quantization error due to a reduction in bit color depth. For example, an electronic display 12 may not be able to produce the full color pallet of the source image data 48 and/or an intermediate bit-depth achieved within the image processing circuitry 28. Instead of merely rounding or estimating to the nearest gray level (GL), the dither block 52 may introduce spatial noise to intertwine GLs of the electronic display 12 at localized display pixels to approximate the original image data (e.g., prior to dithering), thereby providing a more aesthetic, clear, and/or sharp image for viewing at the reduced bit-depth. Additionally or alternatively, the dither block 52 may also provide temporal and/or spatiotemporal dithering which may change and/or alternate GLs in successive images such that, in the temporal average, the perceived bit-depth is greater than the actual bit-depth after the dither block 52.

Figure 8:
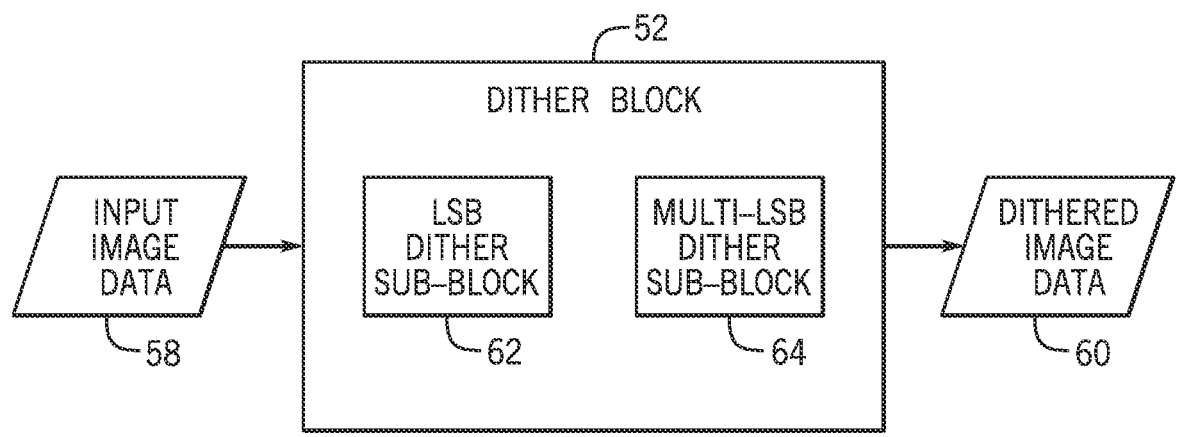
FIG. 8 is a block diagram of the dither block of FIG. 7, in accordance with an embodiment.

In general, the dither block 52 may receive input image data 58 (e.g., the source image data 48 or image data from an other processing block 54) and output dithered image data 60, as shown in FIG. 8. In some embodiments, the dither block 52 may include a least-significant-bit (LSB) dither sub-block 62 and/or a multi-LSB dither sub-block 64. The LSB dither sub-block 62 may reduce the bit-depth of the input image data 58 (e.g., relative to the dithered image data 60) by any desired amount (e.g., 1-bit, 2-bit, 3-bit, 4-bit, and so on) and dither the LSB of the dithered image data 60 such that the average luminance/GL (e.g., temporally and/or spatially) estimates that of the input image data 58. In other words, the output GLs of the LSB dither sub-block 62 may be dithered between GL_N and GL_N+1.

Additionally or alternatively, the multi-LSB dither sub-block 64 may maintain or reduce the bit-depth of the input image data 58 (e.g., relative to the dithered image data 60) while setting a minimum GL activation level (e.g., a threshold GL, also known as GL_on) greater than GL_1. The multi-LSB dither sub-block 64 may also dither the bit associated with the threshold GL of the dithered image data 60, which is a bit greater than the LSB, such that the average luminance/GL (e.g., temporally and/or spatially) estimates that of the input image data 58. In other words, for GLs less than the threshold GL, the output GLs of the multi-LSB dither sub-block 64 may jump from GL_0 (e.g., "off") to the threshold GL, which is greater than GL_1. Such multi-LSB dithering may be of benefit in reducing luminance non-uniformity, particularly at low GLs (e.g., less than gray level (GL) 32/255, less than GL_16/255, less than GL_8/255, less than GL_4/255, or similar relative GLs of other bit-depths).

Figure 9:
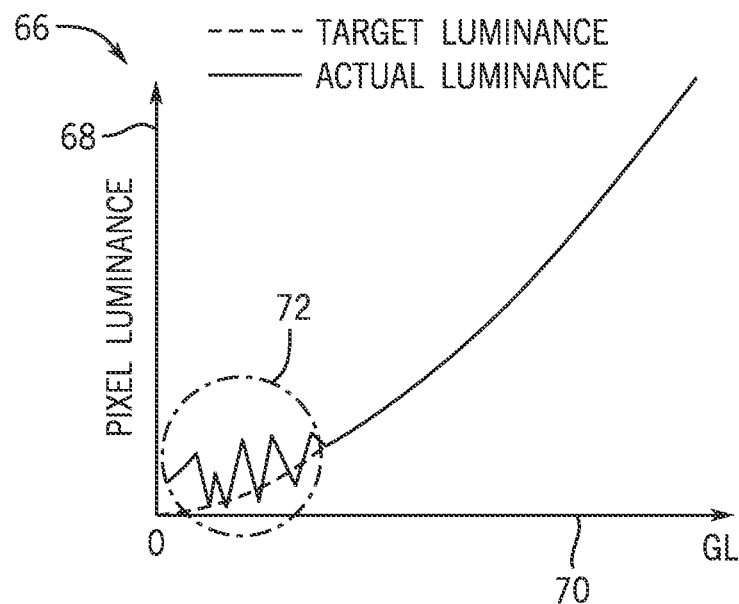
FIG. 9 is a graph of pixel luminance versus gray level (GL) for an example display pixel of a display panel, in accordance with an embodiment.

For example, FIG. 9 is a graph 66 of pixel luminance 68 versus GL_70 for an example display pixel of the display panel 40. In some scenarios, a display pixel may exhibit non-uniformity 72 at certain GLs 70, which may appear as image artifacts (e.g., color or luminance errors) on the electronic display 12. For example, GLs 70 near or less than the threshold activation voltage of the display pixel, which may generally correspond to low GLs 70, may lead to a different pixel luminance 68 responses than desired and may vary from pixel to pixel. As should be appreciated, variations may be caused by manufacturing variations, variations in gamma bus voltages supplied to the pixels, environmental variations, calibration variation, etc.

Figure 10:
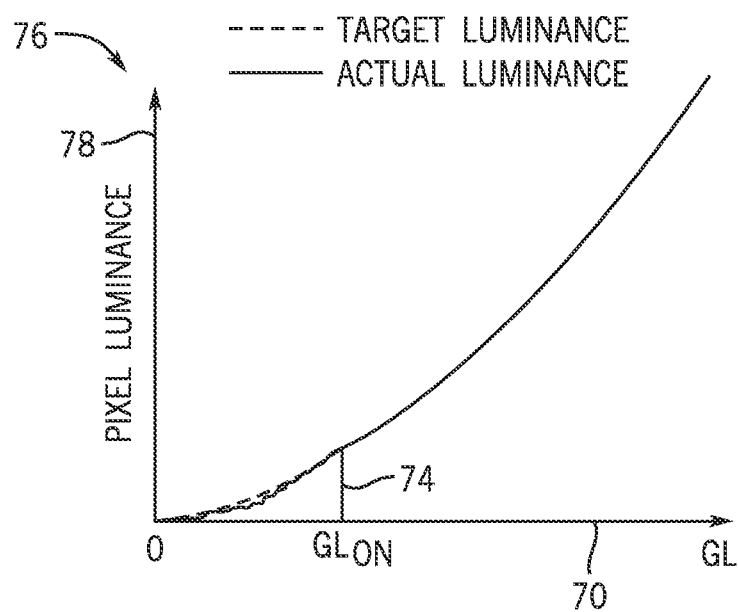
FIG. 10 is graph of pixel luminance versus GL for an example display pixel of the display panel utilizing multi-least-significant-bit (multi-LSB) dithering, in accordance with an embodiment.
Figure 11:
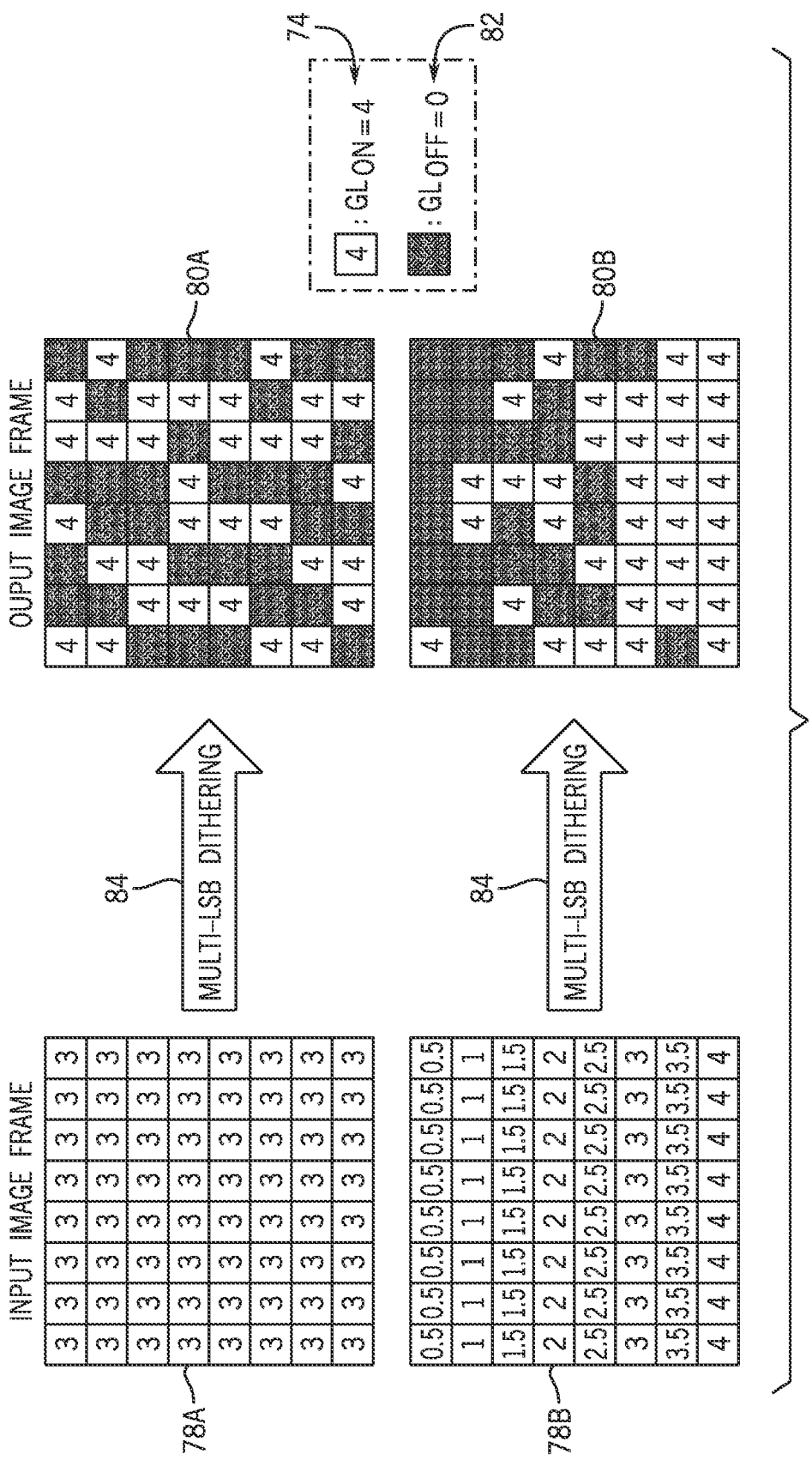
FIG. 11 is a set of two input image frames of input image data and two corresponding output image frames of dithered image data, in accordance with an embodiment.

To help reduce or eliminate the non-uniformity 72 exhibited in a region of GLs 70 (e.g., the low GLs), a threshold GL 74 (e.g., GL_on) may be set as shown in the graph 76 of FIG. 10. In some embodiments, the threshold GL 74 may be utilized as a minimum GL 70 utilized to activate a display pixel and values of the input image data 58 less than the threshold GL 74 may be approximated by dithering (e.g., via the multi-LSB dither sub-block 64). For example, FIG. 11 illustrates two input image frames 78A and 78B (cumulatively 78) of input image data 58 and two corresponding output image frames 80A and 80B (cumulatively 80) of dithered image data 60. As shown in FIG. 11, the bit-depth (e.g., color gamut resolution) of the input image frames 78 are the same as that of the output image frames 80. However, in some embodiments, the output image frames 80 may have a reduced bit-depth. As discussed herein, the threshold GL 74 may be set relative to the bit-depth of the dithered image data 60, which may also be the bit-depth of the display panel 40 (e.g., display image data 56). However, as should be appreciated, the threshold GL 74 may be set in any suitable domain to utilize the present techniques.

In the example of FIG. 11, the threshold GL 74 is set to GL_4, and the image data is dithered between the threshold GL 74 and GL off 82 (e.g., GL_0) to approximate (e.g., in a spatial average) the GLs 70 less than the threshold GL 74. As should be appreciated, the dither patterns illustrated in FIG. 11 are given as examples and are not intended to be limiting. Indeed, any suitable dither pattern may be utilized in conjunction with the multi-LSB dithering 84. Moreover, while FIG. 11 illustrates spatial dithering, temporal or spatiotemporal dithering may also be utilized with multi-LSB dithering 84.

The threshold GL 74 may be selected based on implementation, such as the estimated non-uniformity of the display pixels of the display panel 40. As such, different types of display panels 40 may utilize different threshold GLs 74. Additionally, the threshold GL 74 may be selected as a balance between correcting pixel non-uniformity 72 and generating other artifacts such as banding or dither artifacts. As should be appreciated, by not utilizing some GLs 70, the effective color resolution of the display panel 40 may decrease. This may be countered, at least in part, by the spatial and/or temporal dithering. However, as the threshold GL 74 is increased, the likelihood of the reduced color resolution being perceivable may increase. As such, a balance may be achieved between decreasing non-uniformity 72 and increasing the likelihood of dither artifacts such as banding based on the characteristics of the display panel 40.

Figure 12:
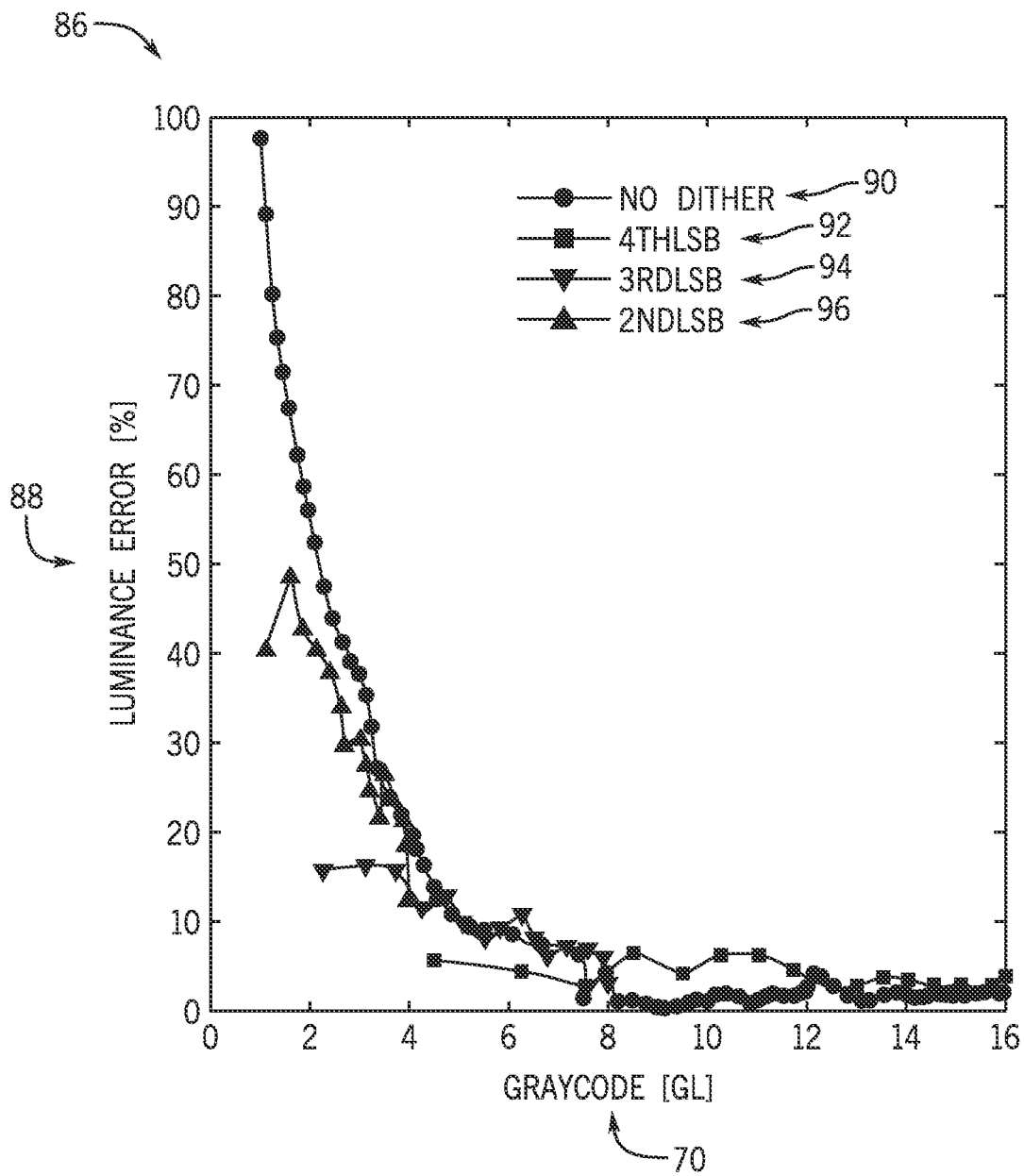
FIG. 12 is a graph of luminance error due to pixel non-uniformity of an example display panel versus GL with no dither and with multi-LSB dithering via multiple different threshold GLs, in accordance with an embodiment.

To help illustrate, FIG. 12 is a graph 86 of luminance error 88 due to pixel non-uniformity 72 of an example display panel 40 versus GL 70 with no dither 90 and multi-LSB dithering 84 utilizing the 4th LSB 92 (e.g., a threshold GL 74 of GL_8), the $3^{rd}$ LSB 94 (e.g., a threshold GL 74 of GL_4), and the $2^{nd}$ LSB 96 (e.g., a threshold GL 74 of GL_2). As illustrated, the luminance error 88 decreases at higher threshold GLs 74. As should be appreciated, the graph 86 of FIG. 12 is indicative of an example display panel 40 and may vary amongst different display panels 40 and/or display panel types/models, but may generally follow the same trends.

Figure 13:
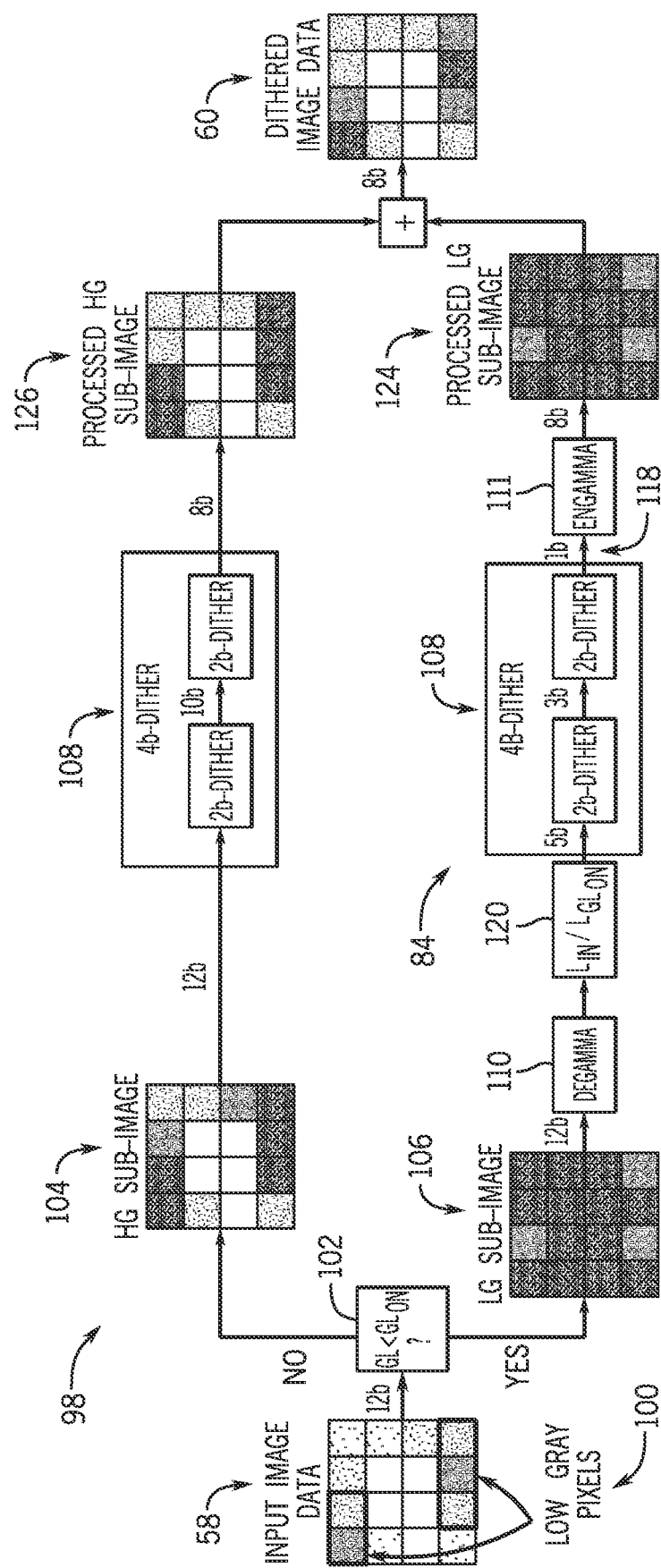
FIG. 13 is a flow diagram of a portion of the dither block, including the multi-LSB sub-block, in accordance with an embodiment.

As discussed herein, the threshold GL 74 may be utilized to dither GLs 70 less than the threshold GL 74. As such, in some embodiments, low GLs 70 (e.g., less than the threshold GL 74 may be treated/processed separately from high GLs 70 (e.g., greater than the threshold GL 74. FIG. 13 is a flow diagram 98 of a portion of the dither block 52, including the multi-LSB sub-block 64. In some scenarios, the input image data 58 may include low gray pixels 100 having GL values less than the threshold GL 74. As should be appreciated, the input image data 58 may be segmented into partitions (e.g., 4×4 partitions, 8×8 partitions, etc.) that are analyzed individually, or an entire image frame may be analyzed together. Regardless, a set of input image data 58 may be analyzed (e.g., at analysis block 102) for whether it contains GLs 70 less than the threshold GL 74. If so, the input image data 58 may be divided into a high gray sub-image 104, which maintains GLs 70 greater than the threshold GL 74 and sets GLs 70 less than the threshold GL 74 to GL_0 for, and a low gray sub-image 106, which maintains GLs 70 less than the threshold GL 74 and sets GLs 70 greater than the threshold GL 74 to GL_0. GLs 70 equal to the threshold GL 74 may be included in either the high gray sub-image 104 or included in the low gray sub-image 106, depending on implementation.

The high gray sub-image 104 may undergo an LSB-dither process 108, which may be equivalent to that of the LSB dither sub-block 62. Indeed, in some embodiments, the high gray sub-image 104 may utilize the LSB dither sub-block 62 to reduce the bit-depth to that of the dithered image data 60, if desired. Similarly, if the input image data 58 does not include GLs 70 less than the threshold GL 74, the input image data may undergo the LSB-dither process 108 utilizing any suitable dither pattern, which may be spatial, temporal, or spatiotemporal. As should be appreciated, although the LSB-dithering process 108 is illustrated as having two two-bit dithering portions that effectively reduce the bit-depth from twelve to eight bits, the bit-depth may be reduced by any number of desired bits while dithering the LSB spatially, temporally, or spatiotemporally. Moreover, if the input image data 58 is already in the desired output bit-depth, the high gray sub-image 104 may undergo no dithering.

In some embodiments, before performing multi-LSB dithering 84, the low gray sub-image 106, which includes GLs 70 less than or equal to the threshold GL 74, may optionally undergo a degamma mapping 110 to a linear domain (e.g., luminance domain) from the GL domain. As discussed further below, performing the dither in a linear domain and then engamma mapping 111 back to the GL domain (e.g., gamma domain) allows the dithered low GLs 70 to better approximate the target luminances. The luminance values, Lin (or GLs 70 if the degamma mapping 110 is not performed), which are less than or equal to a luminance value equivalent, LGL_on, of the threshold GL 74, may be divided by the luminance value equivalent to produce fractional luminance values less than or equal to one.

Figure 14:
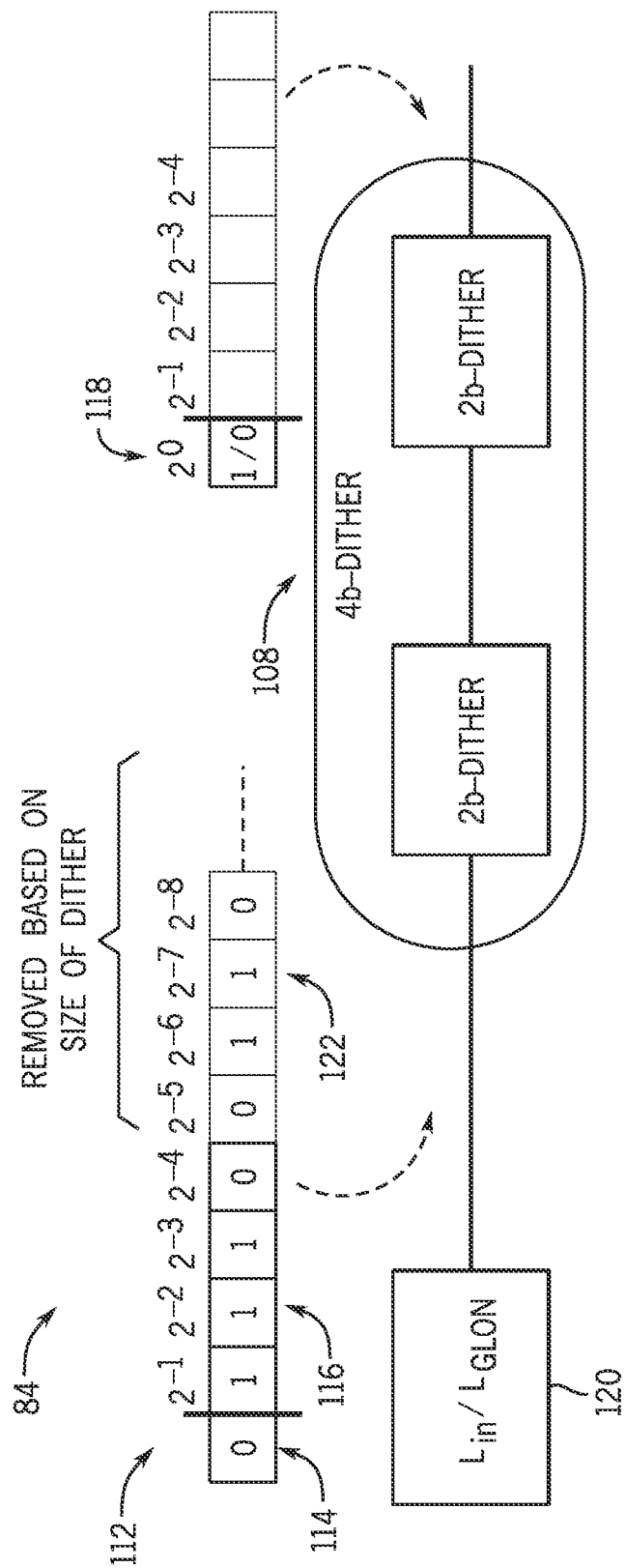
FIG. 14 is a flow diagram of multi-LSB dithering in the linear (e.g., luminance) domain, in accordance with an embodiment.

To help illustrate, FIG. 14 is a flow diagram of multi-LSB dithering 84 in the luminance (e.g., linear) domain. The luminance values, $L_{in}$, are divided by the luminance value equivalent, $L_{GL\_on}$, of the threshold GL 74 to yield fractional luminance values 112. The fractional luminance values 112 may include a most-significant-bit (MSB) 114 representing the luminance value equivalent, $L_{GL\_on}$, and one or more LSBs 116 representing fractions of the luminance value equivalent. The fractional luminance values 112 are dithered (e.g., using any suitable dither pattern such as the LSB-dither process 108) spatially, temporally, or spatiotemporally such that the output is a single dithered bit 118 (for each input luminance value) on the order of the luminance value equivalent. As in the example of FIG. 14, the resulting fractional luminance values 112 from the division 120 may have additional LSBs 122 that are not included in the LSB-dither process 108, but rather truncated, rounded, or otherwise removed from the fractional luminance values 112. How many LSBs 116 are included in the fractional luminance values 112 is set based on the size of the LSB-dither process 108. For example, the fractional luminance values 112 may have five bits if dithered via a 4-bit dither (as shown) or may have seven bits if dithered with a 6-bit dither. Furthermore, it is noted that the size of the LSB-dither process 108 of the fractional luminance values 112 is independent from the selected threshold GL 74.

Returning to FIG. 13, the single dithered bit 118 may be engamma mapped 111 back to the GL domain such that the processed low gray sub-image 124 contains dithered GLs 70 of either GL_0 or GL_on (i.e., the threshold GL 74). For example, for 8-bit dithered image data 60 and a threshold GL 74 of GL_4, the processed low gray sub-image 124 includes GLs 70 of 00000X00 (e.g., in a binary format), where X is dithered between 0 and 1 (effectively dithering the GLs 70 between GL_0 and GL_4). The processed low gray sub-image 124 may be combined with the processed high gray sub-image 126 to generate the dithered image data 60.

Figure 15:
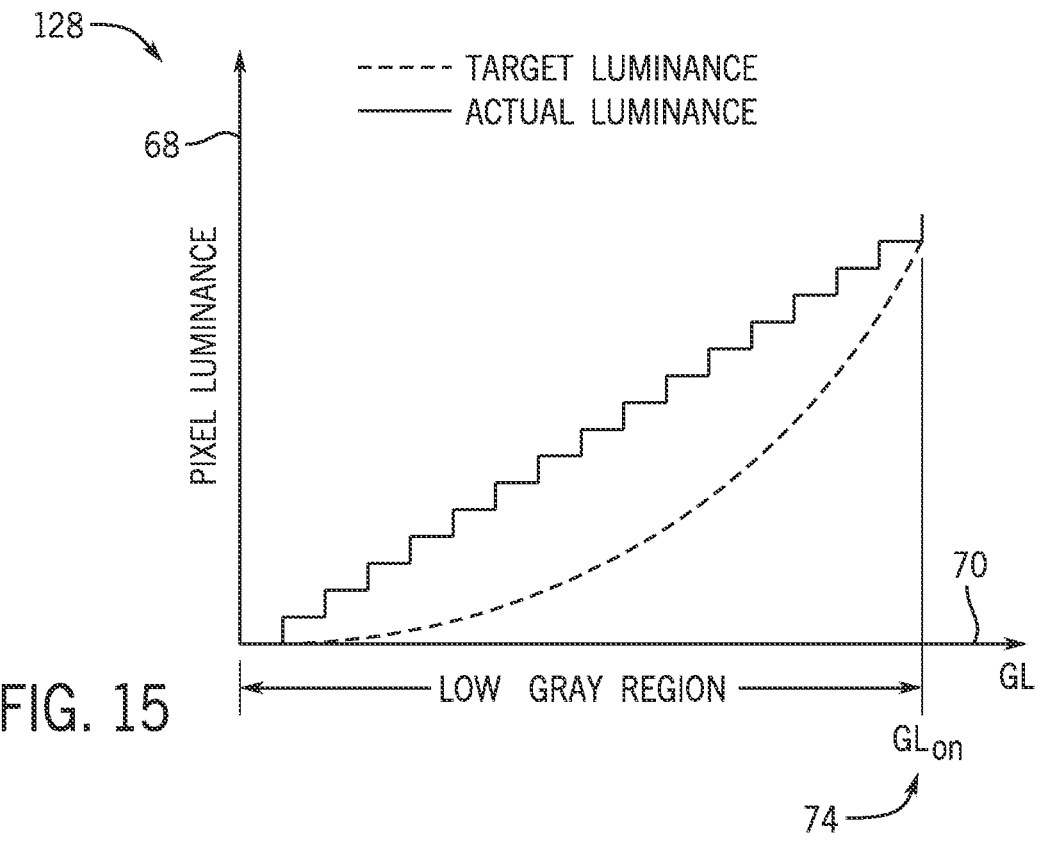
FIG. 15 is a graph of pixel luminance versus GL for GLs between GL_0 and the threshold GL for multi-LSB dithering performed in the GL domain, in accordance with an embodiment.
Figure 16:
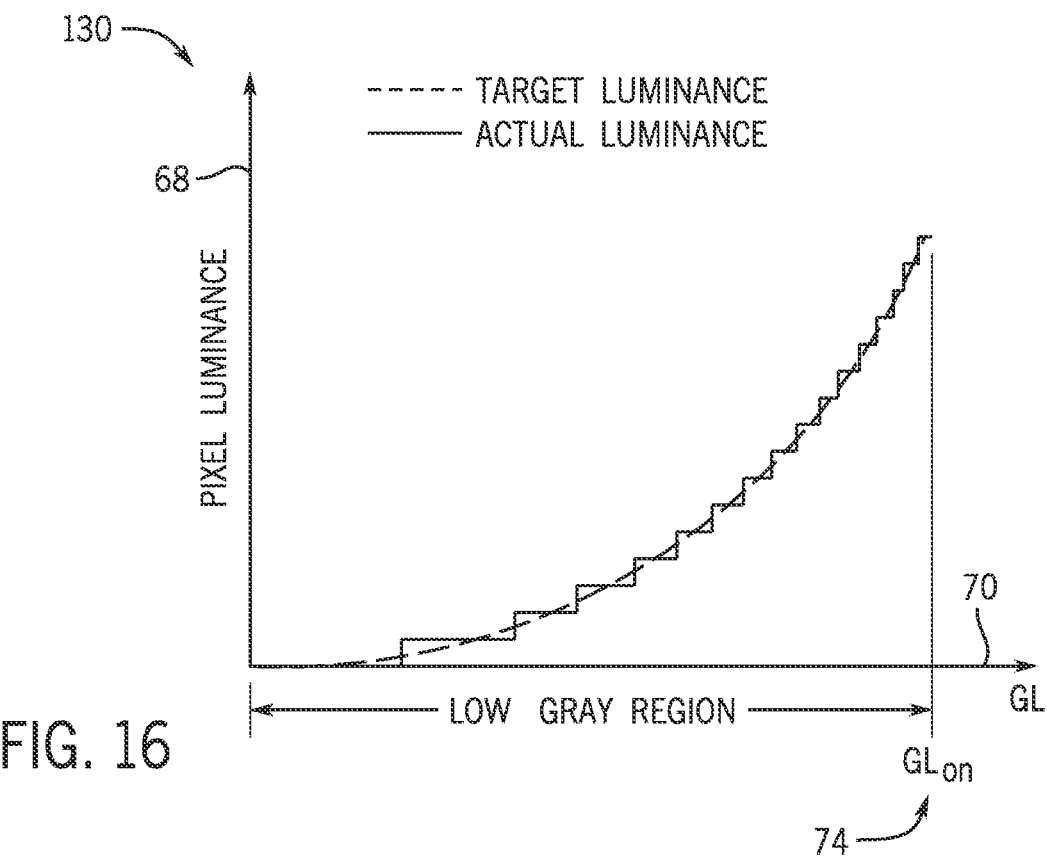
FIG. 16 is a graph of pixel luminance versus GL for GLs between GL_0 and the threshold GL for multi-LSB dithering performed in the linear domain, in accordance with an embodiment.

As stated above, the low gray sub-image 124 may optionally be degamma mapped 110 to a linear luminance domain (if not already in such a domain). By performing the multi-LSB dithering 84 in the linear domain, the averaged dithered pixel luminances may better approximate the target luminances. To help illustrate, FIG. 15 is a graph 128 of pixel luminance 68 versus GL 70 for GLs 70 between GL_0 and the threshold GL 74 for a multi-LSB dithering 84 performed in the GL domain. As illustrated, by performing the multi-LSB dithering 84 in the GL domain, the dither makes a linear approximation of the pixel luminance 68 between GL_0 and the threshold GL 74. However, as shown in the graph 130 of FIG. 16, when the multi-LSB dithering 84 is performed in the linear domain and then engammed mapped 111 back to the GL domain, the multi-LSB dithering 84 more closely follows the non-linear target luminance. As should be appreciated, the step size and/or number of steps depend on implementation and may vary with the selection of the threshold GL 74 and the size of the LSB-dither process 108 within the multi-LSB dithering 84. For example, higher threshold GLs 74 set the low gray region wider, and the higher the number of bits dithered by the LSB-dither process 108 within the multi-LSB dithering 84 the more steps between GL_0 and GL_on.

Figure 17:
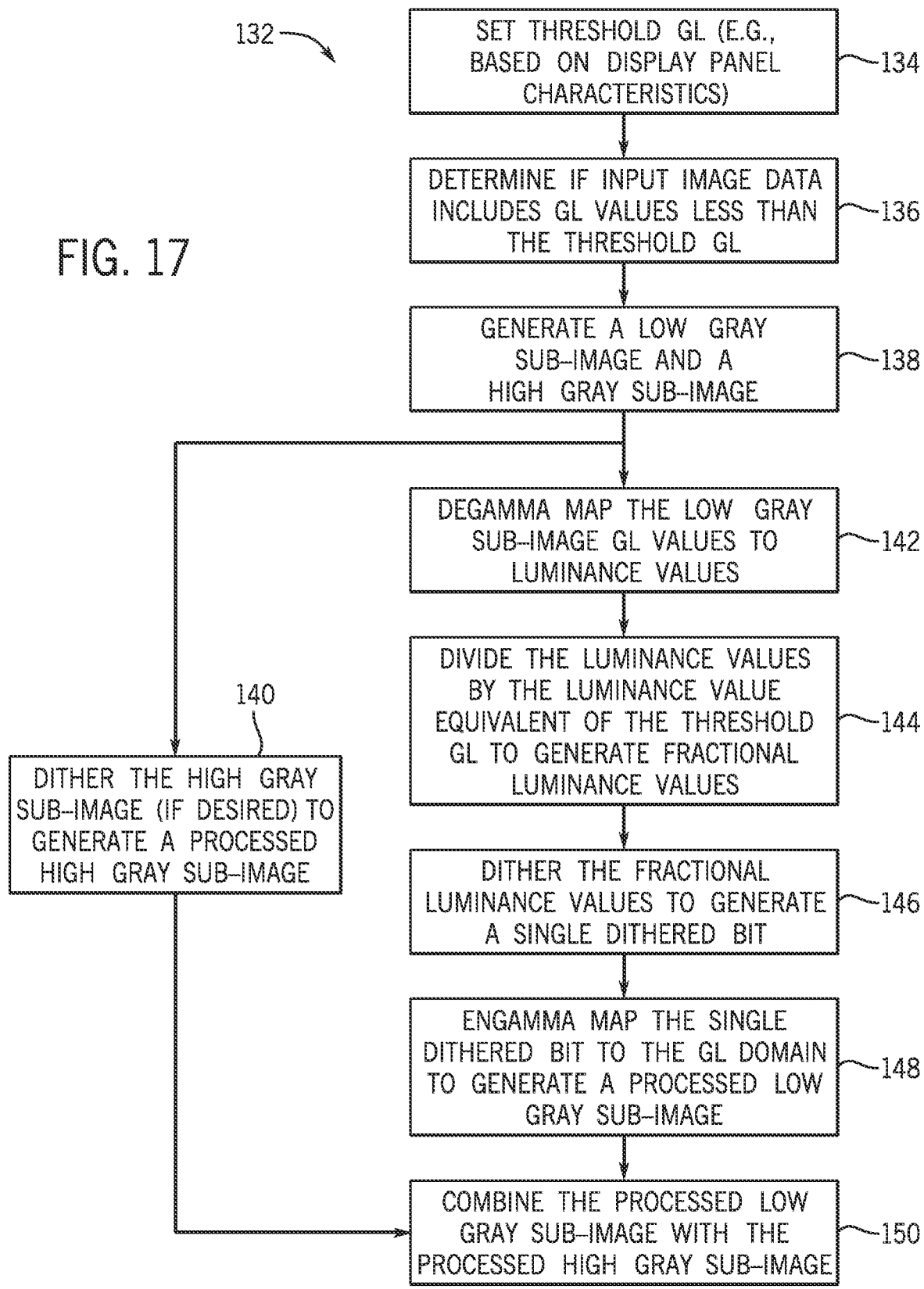
FIG. 17 is an example process for implementing multi-LSB dithering, in accordance with an embodiment.

FIG. 17 is a flowchart 132 of an example process for implementing multi-LSB dithering 84. In general, the threshold GL 74 may be set (e.g., automatically or preset during manufacturing) based on characteristics of the display panel 40 (process block 134). For example, display pixel non-uniformity 72 (actual as measured or estimated) may be used to set the threshold GL 74. As should be appreciated, in some embodiments, the threshold GL 74 may be defined in the luminance domain (e.g., defined by a threshold luminance value) instead of the GL domain. Moreover, if the input image data 58 is in a linear image space (e.g., luminance domain), the degamma mapping 110 and engamma mapping 111 may be excluded, and the techniques discussed herein as being performed in the GL domain may be instead performed in the luminance domain.

For a set threshold GL 74, it is determined whether the input image data 58 includes GL values less than the threshold GL 74 (process block 136). If so, a low gray sub-image 106 and a high gray sub-image 104 may be generated (process block 138). The high gray sub-image 104 may be dithered (e.g., if it is desired to reduce the bit-depth of the input image data 58) to generate a processed high gray sub-image 126 (process block 140). Additionally, the values of the low gray sub-image 106 may be degamma mapped 110 to luminance values (e.g., in a linear domain) (process block 142). The luminance values may then be divided by the luminance value equivalent of the threshold GL 74 (e.g., the threshold GL 74 degamma mapped 110 to the linear domain) to generate fractional luminance values (process block 144). The fractional luminance values may be dithered to generate a single dithered bit for each fractional luminance value (process block 146). The single dithered bits may be engamma mapped 111 to return to the GL domain and generate a processed low gray sub-image 124 (process block 148). As should be appreciated, the single dithered bits may be of the same order of magnitude as the threshold GL 74 (or the luminance value equivalent). In other words, the single dithered bit, when considered at the full bit-depth of the dithered image data 60 (such as in the processed low gray sub-image), does not merely dither the LSB (e.g., as in the LSB-dither process), but rather the $2^{nd}$ LSB, the $3^{rd}$ LSB, the $4^{th}$ LSB, or higher LSB depending on the selected threshold GL 74. The processed low gray sub-image 124 is combined (e.g., added) with the processed high gray sub-image 126 to generate the dithered image data 60 (process block 150). As should be appreciated, if no dithering of the high gray sub-image 104 is desired (e.g., if no change in bit-depth between the input image data 58 and the dithered image data 60 is desired), the processed low gray sub-image 124 may be combined with the high gray sub-image 104 instead of the processed high gray sub-image 126.

The specific embodiments described above have been shown by way of example, and it should be understood that these embodiments may be susceptible to various modifications and alternative forms. Moreover, although the above referenced flowchart 132 is shown in a given order, in certain embodiments, process/decision blocks may be reordered, altered, deleted, and/or occur simultaneously. Additionally, the referenced flowchart 132 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display comprising a plurality of display pixels configured to display an image based on dithered image data; and
image processing circuitry configured to generate the dithered image data based on input image data and a threshold gray level, wherein generating the dithered image data comprises replacing each gray level of the input image data that is less than the threshold gray level with either a zero gray level or the threshold gray level according to a dither pattern, wherein the threshold gray level is greater than one, and wherein the threshold gray level is greater than a range of gray levels that cause display pixel non-uniformity when programmed into the plurality of display pixels.

2. The electronic device of claim 1, wherein replacing each gray level of the input image data that is less than the threshold gray level with either the zero gray level or the threshold gray level comprises:
determining whether the input image data comprises gray levels less than the threshold gray level; and
in response to determining that the input image data does comprise the gray levels less than the threshold gray level:
generating a low gray sub-image excluding gray levels above the threshold gray level;
dividing values of the low gray sub-image by the threshold gray level or an luminance value equivalent of the threshold gray level to generate fractional values; and
dithering the fractional values to generate a single dithered bit for each fractional value.

3. The electronic device of claim 2, wherein in response to determining that the input image data does comprise the gray levels less than the threshold gray level, the image processing circuitry is configured to:
degamma map the low gray sub-image from a gray level domain to a luminance domain to generate the values of the low gray sub-image; and
engamma map the single dithered bit for each fractional value from the luminance domain to the gray level domain.

4. The electronic device of claim 2, wherein in response to determining that the input image data does comprise the gray levels less than the threshold gray level, the image processing circuitry is configured to generate a processed low gray sub-image comprising the single dithered bit for each fractional value of the fractional values.

5. The electronic device of claim 4, wherein the image processing circuitry is configured to generate a high gray sub-image excluding the gray levels less than the threshold gray level.

6. The electronic device of claim 5, wherein the image processing circuitry is configured to dither gray values of the high gray sub-image from a first bit-depth to a second bit-depth, generating a processed high gray sub-image at the second bit-depth.

7. The electronic device of claim 6, wherein the image processing circuitry is configured to combine the processed high gray sub-image and the processed low gray sub-image to generate the dithered image data.

8. The electronic device of claim 4, wherein the single dithered bit for each fractional value is of the same order of magnitude of the threshold gray level.

9. The electronic device of claim 2, wherein the image processing circuitry is configured to truncate the fractional values to an N-bit-depth after the division, and wherein the dithering of the fractional values comprises dithering N−1 bits.

10. The electronic device of claim 1, wherein the image processing circuitry is configured to:
dither a high gray sub-image, wherein the high gray sub-image comprises gray level values greater than the threshold gray level and zero gray values in place of gray level values less than the threshold gray level;
dither a low gray sub-image, wherein the low gray sub-image comprises the gray level values less than the threshold gray level and the zero gray values in place of the gray level values greater than the threshold gray level; and
combine the dithered high gray sub-image and the dithered low gray sub-image to generate the dithered image data.

11. A method comprising:
receiving, via a dither block of image processing circuitry, input image data;
determining whether a set of values of the input image data comprises values less than a threshold value; and
in response to determining that the input image data does comprise the values less the threshold value:
separating the set of values into a high gray sub-image and a low gray sub-image, wherein the high gray sub-image comprises values greater than the threshold value and the low gray sub-image comprises the values less than the threshold value;

dividing the values less than the threshold value of the low gray sub-image by the threshold value to generate fractional values;

dithering the fractional values to generate a single dithered bit for each fractional value; and generating a processed low gray sub-image based on the single dithered bit for each fractional value; and combine the processed low gray sub-image with the high gray sub-image or a processed high gray sub-image to generate dithered image data.

12. The method of claim 11, comprising degamma mapping the low gray sub-image and the threshold value prior to the division.

13. The method of claim 12, comprising engamma mapping the single dither bit for each fractional value prior to generating the processed low gray sub-image.

14. The method of claim 11, wherein the high gray sub-image comprises zero values in place of the values less than the threshold value, and wherein the low gray sub-image comprises the zero values in place of the values greater than the threshold value.

15. The method of claim 11, wherein the set of values are in a linear luminance domain.

16. The method of claim 11, comprising dithering the high gray sub-image by a number of bits to generate the processed high gray sub-image, wherein the processed high gray sub-image comprises a first bit-depth less than a second bit-depth of the high gray sub-image by the number of bits.

17. The method of claim 11, comprising determining the threshold value based on one or more characteristics of an electronic display coupled to the image processing circuitry.

18. Image processing circuitry comprising:

least-significant-bit dither circuitry configured to dither a high gray sub-image, wherein the high gray sub-image comprises gray level values greater than a threshold gray level and zero gray values in place of gray level values less than the threshold gray level; and multi-least-significant-bit dither circuitry configured to:
dither a low gray sub-image, wherein the low gray sub-image comprises the gray level values less than the threshold gray level and the zero gray values in place of the gray level values greater than the threshold gray level; and combine the dithered high gray sub-image and the dithered low gray sub-image to generate dithered image data that does not include gray levels less than threshold gray level.

19. The image processing circuitry of claim 18, wherein the multi-least-significant-bit dither circuitry is configured to:

degamma map the gray levels less than the threshold gray level of the low gray sub-image to generate luminance values;

divide the luminance values by a threshold luminance value equivalent to the threshold gray level to generate fractional luminance values;

dither the fractional luminance values such that a bit-depth of the fractional luminance values is reduced to one; and engamma map the dithered fractional luminance values to generate the dithered low gray sub-image.

20. The image processing circuitry of claim 18, wherein the threshold gray level is greater than gray level one.

* * * * *